UNITED STATES PATENT OFFICE.

HENRI COLLET, OF PARIS, FRANCE.

TREATMENT OF EXCRETA FOR THE PRODUCTION OF FERTILIZING SUBSTANCES.

SPECIFICATION forming part of Letters Patent No. 260,165, dated June 27, 1882.

Application filed September 27, 1881. (No specimens.) Patented in France April 8 and September 1, 1880; in England May 9, 1881, No. 2,004, and in Belgium August 3, 1881.

*To all whom it may concern:*

Be it known that I, HENRI COLLET, a citizen of France, residing at Paris, in the Republic of France, manufacturer, have invented an Improvement in Treatment of Excreta for the Production of Fertilizing Substances Therefrom, (for which I have obtained patents in France, dated 8th April, 1880, and 1st September, 1880; in England, dated 9th May, 1881, No. 2,004, and in Belgium, dated 3d August, 1881,) of which the following is a specification.

It will be understood that by the above term "sewage" I do not mean sewage in its broad sense—that is to say, of the liquid or semi-liquid matter issuing from house-drains—the matter which I treat being the excreta emptied out of cesspools.

The process for treating excreta or fecal matter so as to separate and secure the fertilizing ingredients according to my invention consists in entrapping in a gelatinous mass the solid matters suspended in the liquid, causing the magma produced to rise as a scum in consequence of a rapid liberation of gas. These conditions are fulfilled by the use of a special substance, which I term "nitriolic powder," and I prepare in the following manner: To one hundred parts, by weight, of sulphate of iron I add ten parts of nitric acid and six parts of sulphuric acid, thus producing a sulphate of sesquionide of iron. Of this sesquionide I take thirty parts, by weight, and mix with one hundred parts of clay or argillaceous earth and leave the mixture for several days to season.

This is the nitriolic powder, which I employ in the following manner: The excreta or fecal matter being collected in any suitable vessel, I throw into it nitriolic powder in the proportion of about four parts, by weight, of the powder to one hundred parts of the fecal matter. The matter effervesces, and in about two hours a thick gelatinous scum is formed, which floats on the top, leaving the liquid below almost limpid. I drain or pump off this liquid into a boiler, and extract from it the ammonia by boiling about one hour. The ammonia thus produced may be absorbed in the usual way by water or acid, and commercially disposed of. The gelatinous scum which was left after draining off the liquid is placed in a cylindrical vessel of ordinary construction, in which it is heated and agitated for about three hours, being then in the condition of dry powdery manure.

What I claim is—

The herein-described method of separating the solid and liquid constituents of excreta, and collecting the solid ingredients in a scum by the application of nitriolic powder, prepared substantially as herein set forth.

In testimony whereof I have signed my name to this specifiation, in the presence of two subscribing witnesses, this 26th day of August, A. D. 1881.

HENRI COLLET.

Witnesses:
 JULES DUPONT,
 JULES DIGEON.